United States Patent
Lee et al.

(10) Patent No.: US 9,130,389 B2
(45) Date of Patent: Sep. 8, 2015

(54) APPARATUS FOR WIRELESS POWER TRANSMISSION USING MULTI ANTENNA AND METHOD FOR CONTROLLING THE SAME

(75) Inventors: Ji-Hyung Lee, Suwon-Si (KR); Lae-Hyuk Park, Seoul (KR); Un-Kyoo Park, Seoul (KR)

(73) Assignee: LS CABLE & SYSTEM LTD., Anyang, Gyeonggi-do (KR)

( * ) Notice: Subject to any disclaimer, the term of this patent is extended or adjusted under 35 U.S.C. 154(b) by 460 days.

(21) Appl. No.: 13/602,756

(22) Filed: Sep. 4, 2012

(65) Prior Publication Data
US 2013/0057205 A1  Mar. 7, 2013

(30) Foreign Application Priority Data

Sep. 5, 2011  (KR) .................... 10-2011-0089752

(51) Int. Cl.
*H02J 5/00* (2006.01)

(52) U.S. Cl.
CPC ..................... *H02J 5/005* (2013.01)

(58) Field of Classification Search
CPC .................. H02J 5/005; H02J 7/00
USPC ........................................ 320/108
See application file for complete search history.

(56) References Cited

U.S. PATENT DOCUMENTS

2009/0140691 A1  6/2009  Jung
2011/0018679 A1*  1/2011  Davis et al. .................... 340/3.1

FOREIGN PATENT DOCUMENTS

CN  101447683 A  3/2009
KR  10-2009-0131746 A  12/2009

* cited by examiner

*Primary Examiner* — Thuan Do
(74) *Attorney, Agent, or Firm* — Sherr & Jiang, PLLC

(57) ABSTRACT

A wireless power transmission apparatus includes at least one power transmission antenna for transmitting a wireless power signal in a magnetic resonance manner by using a resonant frequency having different bandwidths from each other; a wireless power signal generating module for generating the wireless power signal; at least one wireless power converting module for converting a power level of the wireless power signal generated by the wireless power signal generating module and having different power level conversion ranges corresponding to the bandwidth of the resonant frequency of the power transmission antenna; a multiplexer matching module for selectively connecting the wireless power converting module to a corresponding power transmission antenna; and a control unit for selectively connecting the power transmission antenna and the wireless power converting module according to a required power of a device to be charged to adjust the power level of the wireless power signal.

9 Claims, 4 Drawing Sheets

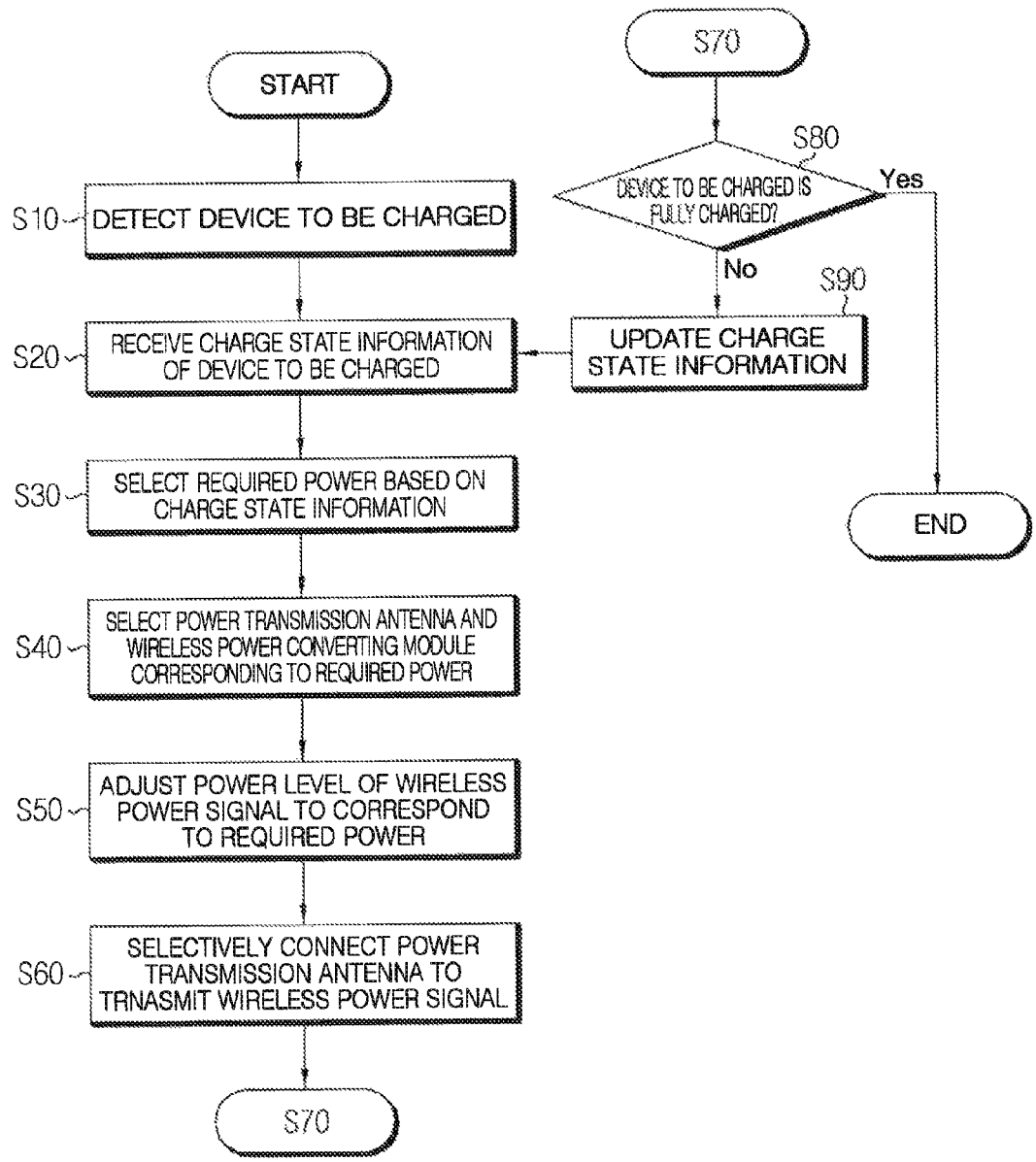

APPARATUS FOR WIRELESS POWER TRANSMISSION USING MULTI ANTENNA AND METHOD FOR CONTROLLING THE SAME

CROSS-REFERENCE TO RELATED APPLICATION

This application claims priority under 35 USC 119 (a) to Korean Patent Application No. 10-2011-0089752 filed in the Republic of Korea on Sep. 5, 2011, the entire contents of which are incorporated herein by reference.

BACKGROUND OF THE DISCLOSURE

1. Field of the Disclosure

The present disclosure relates to an apparatus for wireless power transmission for transmitting power to portable electronic devices or small home appliances in a wireless manner to be used for charging a battery or operating the devices, and more particularly, to a wireless power transmission apparatus in which an antenna in charge of power transmission is configured as a multi antenna to optimize the power transmission efficiency for various devices which need charging.

2. Description of the Related Art

Portable electronic devices such as mobile communication terminals, PDA, PMP, and notebooks generally use rechargeable secondary batteries in order to enhance the convenience of users. By using such a battery as a driving power source, a user may become free of wired power supplies and thus use various products more conveniently.

A battery stores energy by being charged from an external power source, and a separate wired charging device is generally used for supplying a household power as a rated power useable for the battery in order to charge the battery.

Generally, in a wired charging method, a terminal of the charging device physically contacts a terminal of the battery for electric connection.

However, since the electric coupling is obtained by physical contact in the above method, the reliability of the connection may deteriorate due to physical abrasion. In addition, since the contact terminal tends to expose out, the contact state may become inferior due to contaminations caused by impurities. Moreover, in a moist or humid environment, problems such as an electric short circuit may occur or may easily lose the charged energy.

In order to solve the problems of the contact-type charging method, a non-contact charging system where a charging terminal does not physically contact the terminal of a battery is disclosed. The non-contact charging method uses the phenomenon that, if a magnetic flux in a magnetic field at a primary coil changes according to time, power is induced at a second coil adjacent thereto due to the magnetic field changing according to the time, as well known in the art.

FIG. 1 is a general schematic view showing a non-contact charging device and a battery using an induced electromotive force.

Referring to FIG. 1, a general non-contact charging device 10 includes a high frequency power generating unit 30 for receiving power from an AC power source 20 and outputting a high frequency AC current, and a primary coil 40 for receiving the high frequency AC current from the high frequency power generating unit 30 and forming a magnetic field M.

In addition, a battery 50 includes a battery cell 60 charged with an electric energy, a secondary coil 70 to which a high frequency AC current is induced according to the linkage of the magnetic field M generated at the primary coil 40, a rectifier 80 for converting the high frequency AC current induced at the secondary coil 70 into a DC current, and a constant-voltage/constant-current supplying unit 90 for applying the DC current rectified by the rectifier 80 to the battery cell 60. Here, the constant-voltage/constant-current supplying unit 90 is a circuit element widely used for battery charging devices. The constant-voltage/constant-current supplying unit 90 supplies a constant current to the battery cell 60 at an initial charging stage, and if the charging voltage of the battery cell 60 gradually increases and exceeds a specific reference value, the constant-voltage/constant-current supplying unit 90 maintains the voltage consistently, instead of decreasing the supplied current, until the battery cell 60 comes to a fully-charged state.

The general non-contact charging device 10 is configured by providing a wireless base pad including the primary coil 40 for generating an induced electromotive force, and placing a battery 50 having a secondary coil 70 corresponding to the primary coil 40 on the wireless base pad. However, in this configuration, the coil for generating the induced electromotive force should have a planar shape, and there is directivity between a power transmitting side and a power receiving side. Therefore, there is a limit in selecting the battery 50 which should be charged. For this reason, the charging efficiency may vary depending on the location of the battery 50 to be charged.

In addition, in the case where several devices require power to be charged, the general non-contact charging device 10 may additionally include a power converting module for transmitting power suitable for several devices, and the power converting module supplies power to several devices according to a control algorithm such as a time division control algorithm. However, although power may be transmitted to several devices requiring the same power, in order to charge several devices requiring different power, a complicated control algorithm should be considered. For this reason, power is unnecessarily wasted, which deteriorates the power transmission efficiency. In addition, in the case where the power converting module is designed to have a wide power conversion range, the efficiency of the power converting module deteriorates.

SUMMARY OF THE DISCLOSURE

The present disclosure is designed to solve the problems of the prior art, and therefore the present disclosure is directed to providing an apparatus for wireless power transmission using a multi antenna, which may optimize the power transmission efficiency for various devices to be charged, by configuring the antenna in charge of wireless power transmission as a multi antenna. The present disclosure is also directed to providing a method for controlling the above wireless power transmission apparatus.

In one aspect, the present disclosure provides an apparatus for wireless power transmission, which includes at least one power transmission antenna for transmitting a wireless power signal in a magnetic resonance manner by using resonant frequencies, the resonant frequencies having different bandwidths from each other; a wireless power signal generating module for generating the wireless power signal; at least one wireless power converting module for converting a power level of the wireless power signal generated by the wireless power signal generating module, the wireless power converting module having different power level conversion ranges from each other corresponding to the bandwidth of the resonant frequency of the power transmission antenna; a multiplexer matching module for selectively connecting the wireless power converting module to a corresponding power transmission antenna; and a control unit for selectively connecting the power transmission antenna and the wireless power converting module according to a required power of a device to be charged to adjust the power level of the wireless power signal.

Preferably, the apparatus further includes a wireless communication module for sending a detecting signal to detect the device to be charged and performing data communication with the detected device to be charged.

Preferably, the control unit receives charge state information of the device to be charged, detected by the wireless communication module.

Preferably, the control unit calculates the required power of the device to be charged, based on the charge state information of the device to be charged.

Preferably, the charge state information of the device to be charged includes an identification code for distinctively identifying the corresponding device to be charged and the required power.

Preferably, the control unit continuously monitors the charge state information of the device to be charged, recalculates a required power of the device to be charged according to the monitoring result, and adjusts the power level of the wireless power signal according to the recalculated required power.

Preferably, in the case where the number of the device to be charged is at least one, the control unit transmits a wireless power signal to each device to be charged by means of time division control.

Preferably, the multiplexer matching module matches impedances between the wireless power converting module and the power transmission antenna.

In another aspect, the present disclosure provides a method for controlling wireless power transmission, which includes (a) selecting a tower transmission antenna having a bandwidth of a resonant frequency capable of transmitting a wireless power signal corresponding to a required power of a device to be charged, and a wireless power converting module having a power level conversion range corresponding to the bandwidth of the resonant frequency of the corresponding power transmission antenna; (b) controlling the selected wireless power converting module to adjust a power level of the wireless power signal according to the required power of the device to be charged; and (c) connecting the selected wireless power converting module to the power transmission antenna to transmit the wireless power signal.

Preferably, before the step (a), the method further includes sending a detecting signal for detecting a device to be charged in order to detect the device to be charged; arid performing data communication with the detected device to be charged and receiving charge state information of the device to be charged.

Preferably, in the step (a), a required power of the device to be charged is calculated based on the charge state information of the device to be charged.

Preferably, the charge state information of the device to be charged includes an identification code for distinctively identifying the corresponding device to be charged and the required power.

Preferably, after the step (c), the method further includes constantly monitoring the charge state information of the device to be charged; recalculating a required power of the device to be charged according to the monitoring result; and adjusting the power level of the wireless power signal according to the recalculated required power.

Preferably, in the step (a), in the case where the number of the device to be charged is at least one, the wireless power signal is transmitted to each device to be charged by means of time division control.

Preferably, in the step (c), impedances between the wireless power converting module and the power transmission antenna are matched.

BRIEF DESCRIPTION OF THE DRAWINGS

Other objects and aspects of the present disclosure will become apparent front the following descriptions of the embodiments with reference to the accompanying drawings in which:

FIG. 4 is a flowchart for illustrating a wireless power transmission method of the wireless power transmission apparatus according to the present disclosure.

REFERENCE SYMBOLS

100: wireless power transmission apparatus
110A, 110B, 110N: power transmission antenna
120: wireless power signal generating module
130A, 130B, 130N: power converting module
140: multiplexer matching module
150: wireless communication module
160: control unit

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
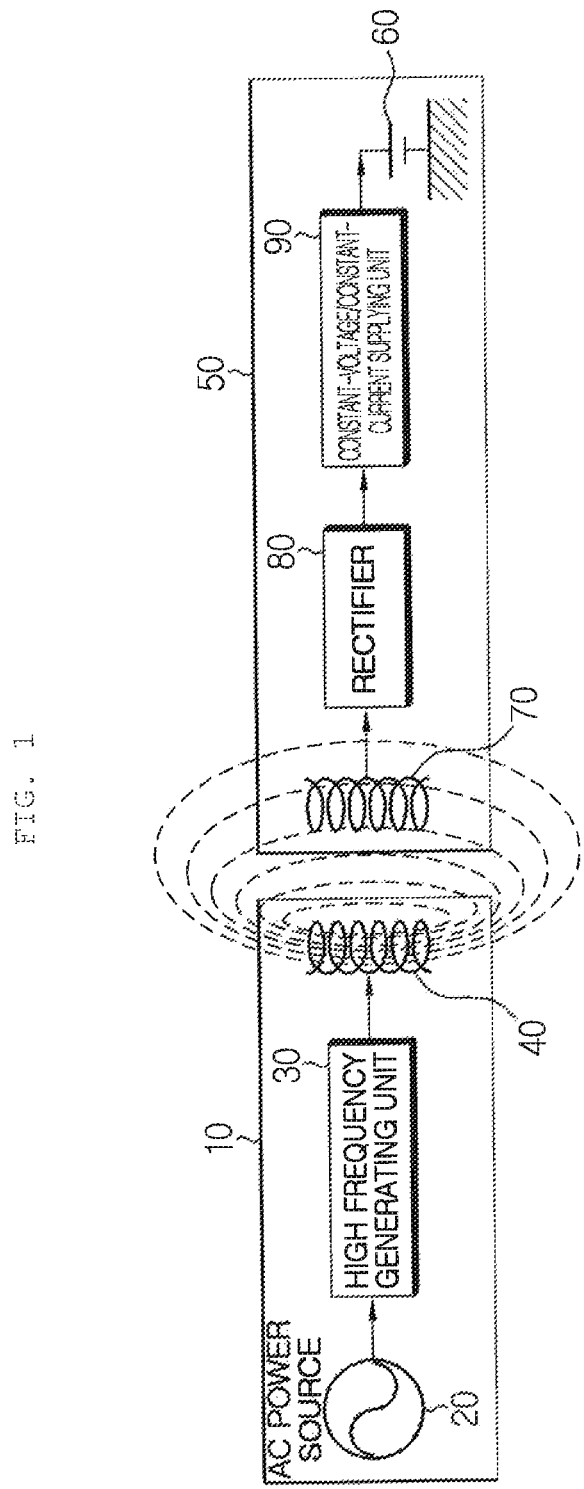
FIG. 1 is a schematic view showing a non-contact charging device and a battery using a general induced electromotive force manner.
Figure 2:
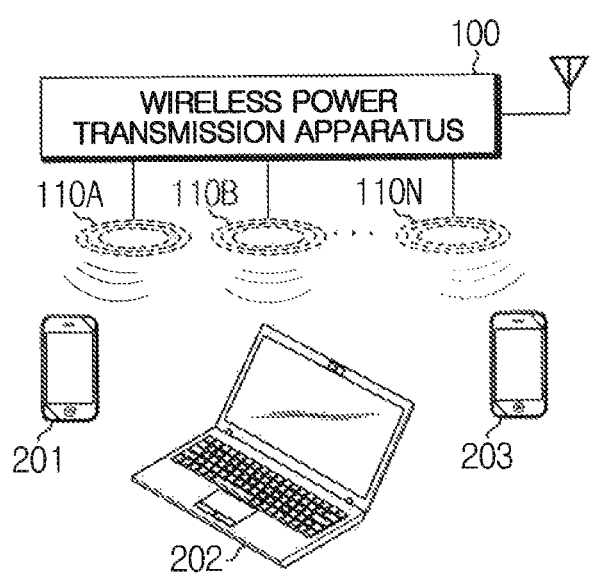
FIG. 2 is a schematic view showing a wireless power transmission apparatus according to the present disclosure.
Figure 3:
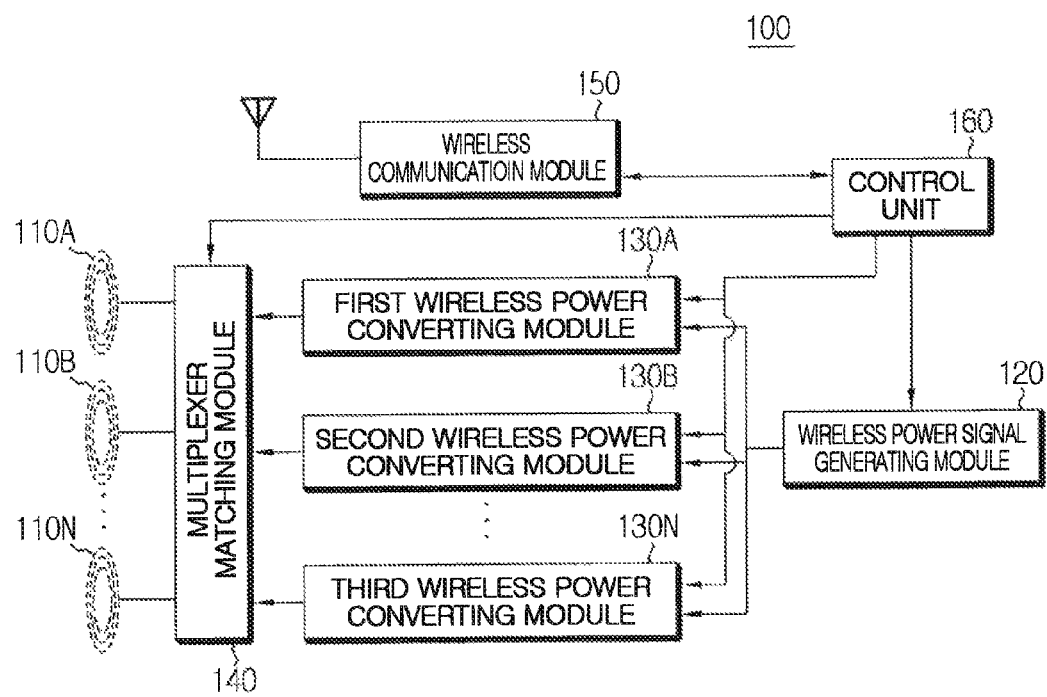
FIG. 3 is a block diagram showing the wireless power transmission apparatus according to the present disclosure.

FIG. 2 is a schematic view showing a wireless power transmission apparatus according to the present disclosure, FIG. 3 is a block diagram showing the wireless power transmission apparatus according to the present disclosure, and FIG. 4 is a flowchart for illustrating a wireless power transmission method of the wireless power transmission apparatus according to the present disclosure.

Referring to FIGS. 2 and 3, the wireless power transmission apparatus 100 according to the present disclosure transmits power to devices to be charged 201, 202, 203 such as portable electronic devices and small home appliances in a wireless manner to either charge batteries of the corresponding devices to be charged 201, 202, 203 or to operate the devices.

In the present disclosure, the wireless power transmission apparatus 100 includes at least one power transmission antennas 110A, 110B, 110N for wireless power transmission.

The power transmission antennas 110A, 110B, 110N transmit wireless power signals in a magnetic resonance manner by using resonant frequencies, and are designed so that the resonant frequencies have different bandwidths. Even though a general wireless power transmission apparatus includes a single power transmission antenna and a single wireless power converting module, the wireless power transmission apparatus 100 according to the present disclosure includes a plurality of power transmission antennas 110A, 110B, 110N having different bandwidths of the resonant frequencies, and a plurality of wireless power converting modules 130A, 130B, 130N having power level conversion ranges optimized for the bandwidths of the resonant frequencies of the plurality of power transmission antennas 110A, 110B, 110N. Therefore, problems such as the general wireless power transmission apparatus having bad efficiency in transmitting power to a plurality of devices to be charged, having different required powers, and the power converting module having to be designed to have a large power conversion range do not occur in the wireless power transmission apparatus of the present disclosure. In other words, since the wireless power transmission apparatus 100 according to the present disclosure may select a power transmission antenna 110A, 110B, 110N and a wireless power converting module 130A, 130B, 130N, which are optimized for the required power, from a plurality of power transmission antennas 110A, 110B, 110N having different bandwidths of resonant frequencies and a plurality of wireless power converting modules 130A, 130B, 130N corresponding thereto and control the power level of the wireless power signal by using the same, the transmission efficiency of the wireless power signal may be optimized.

Hereinafter, the detailed configuration of the wireless power transmission apparatus 100 according to the present disclosure will be described with reference to FIG. 3.

The wireless power transmission apparatus 100 according to the present disclosure includes at least one power transmission antenna 110A, 110B, 110N, a wireless power signal generating module 120, at least one wireless power converting module 130A, 130B, 130N, a multiplexer matching module 140, a wireless communication module 150, and a control unit 160 for controlling the above components.

The power transmission antenna 110, 110B, 110N is a non-radiative antenna which is a signal transmission medium for transmitting a wireless power signal in a magnetic resonance manner by using a resonant frequency. A plurality of power transmission antennas 110A, 110B, 110N is provided so that the resonant frequencies have different bandwidths.

The wireless power signal generating module 120 generates a wireless power signal in order to perform wireless power transmission.

The wireless power converting module 130A, 130B, 130N converts a power level of the wireless power signal generated by the wireless power signal generating module 120. A plurality of wireless power converting modules 130A, 130B, 130N is provided to have different power level conversion ranges corresponding to the bandwidths of the resonant frequencies of the power transmission antennas 110A, 110B, 110N.

The multiplexer matching module 140 selectively connects the wireless power converting module 130A, 130B, 130N to the corresponding power transmission antenna 110A, 110B, 110N, and matches impedances between the wireless power converting module 130A, 130B, 130N and the power transmission antenna 110A, 110B, 110N which connect to each other.

The wireless communication module 150 sends a detecting signal to detect the device to be charged 201, 202, 203, and performs data communication with the detected device to be charged 201, 202, 203.

The control unit 160 acts like a kind of microprocessor and performs a process of controlling each component as a whole to ensure wireless power transmission. In the wireless power transmission process using the control unit 160, data communication is performed with the device to be charged 201, 202, 203 detected by the wireless communication module 150 to receive charge state information of the device to be charged 201, 202, 203, and a required power of the corresponding device to be charged 201, 202, 203 is calculated based on the received charge state information. After that, the control unit 160 selects the power transmission antenna 110A, 110B, 110N and the wireless power converting module 130A, 130B, 130N corresponding thereto so that the wireless power signal corresponding to the calculated required power may be transmitted, and adjusts the power level of the wireless power signal. After that, the control unit 160 controls the multiplexer matching module 140 to selectively connect the wireless power converting module 130A, 130B, 130N to the power transmission antenna 110A, 110B, 110N, thereby transmitting the wireless power signal through the power transmission antenna 110A, 110B, 110N. Here, the charge state information received from the device to be charged 201, 202, 203 includes an identification code for distinctively identifying the corresponding device to be charged 201, 202, 203 and the required power.

In addition, the control unit 160 continuously performs data communication with she device to be charged 201, 202, 203 to monitor the charge state information of the corresponding device to be charged 201, 202, 203. The control unit 160 recalculates a required power of the device to be charged 201, 202, 203 according to the monitoring result, and controls the wireless power converting module 130A, 130B, 130N to correspond to the recalculated required power and adjusts the power level of the wireless power signal so that the wireless power signal is maintained in an optimal state until the device to be charged 201, 202, 203 is fully charged.

Meanwhile, in the case where the number of the detected device to be charged 201, 202, 203 is at least one, the control unit 160 controls so that the wireless power signal may be transmitted to each device to be charged 201, 202, 203 by means of time division control. In this case, in the present disclosure, since the plurality of wireless power converting modules 130A, 130B, 130N and the plurality of power transmission antennas 110A, 110B, 110N are provided, the wireless power converting modules 130A, 130B, 130N and the power transmission antennas 110A, 110B, 110N may be selectively controlled according to the required power of each device to be charged 201, 202, 203, thereby optimizing the transmission efficiency of the wireless power signal. For example, in the case where a notebook having a required power of 20 W and a mobile communication terminal having a required power of 5 W are simultaneously detected as requesting to be charged, the wireless power converting modules 130A, 130B, 130N and the power transmission antennas 110A, 110B, 110N corresponding to 20 W and 5 W are respectively selected for charging them by means of time division control, thereby enhancing the power transmission efficiency.

As an alternative, even though it has been described that the power transmission antenna 110A, 110B, 110N transmits wireless power in the above embodiment, the present disclosure is not limited thereto, and the power transmission antenna 110A, 110B, 110N may perform data communication with the device to be charged 201, 202, 203. In this case, WLAN, Bluetooth, Zigbee, magnetic field communication model or the like may be individually connected to each power transmission antenna 110A, 110B, 110N.

FIG. 4 is a flowchart for illustrating a wireless power transmission method of the wireless power transmission apparatus according to the present disclosure.

Hereinafter, the wireless power transmission method of the wireless power transmission apparatus according to the present disclosure will be described with reference to FIG. 4.

First, in Step S10, the control unit 160 controls the wireless communication module 150 to send a detecting signal for detecting a device to be charged 201, 202, 203 so that the device to be charged 201, 202, 203 is detected. In other words, the control unit 160 periodically sends a ping signal as a detecting signal through the wireless communication module 150, and determines whether the device to be charged 201, 202, 203 is detected based on the magnitude of a reflected signal received therein.

In Step S20, the control unit 160 performs data communication with the detected, device to be charged 201, 202, 203 to receive charge state information of the device to be charged 201, 202, 203. In other words, the control unit 160 transmits a command signal which commands the device to be charged 201, 202, 203 detected by the wireless communication module 150 to send the charge state information, and, if the device to be charged 201, 202, 203 sends the charge state information as a response, the control unit 160 receives the charge state in formation. Here, the charge state information may include an identification code for distinctively identifying the corresponding device to be charged 201, 202, 203 and the required power information. In this case, the control unit 160 firstly receives the identification code to identify the device to be charged, and then, if the device to be charged is identified, the control unit 160 receives the required power information.

In Step S30, the control unit 160 calculates a required power of the device to be charged 201, 202, 203 based on the charge state information of the device to be charged 201, 202, 203.

In Step S40, the control unit 160 selects a power transmission antenna 110A, 110B, 110N having a bandwidth of a resonant frequency capable of transmitting a wireless power signal corresponding to the calculated required power, and a wireless power converting module 130A, 130B, 130N corresponding thereto.

In Step 350, the control unit 160 controls the wireless power converting module 130A, 130B, 130N to correspond to the required power of the device to be charged 201, 202, 203 so that the power level of the wireless power signal is adjusted.

In Step S60, the control unit 160 controls the multiplexer matching module 140 to selectively connect the wireless power converting module 130A, 130B, 130N, where the power level or the wireless power signal is adjusted, to the power transmission antenna 110A, 110B, 110N corresponding thereto, and transmits the wireless power signal. At this time, the multiplexer matching module 140 matches impedances between the wireless power converting module 130A, 130B, 130N and the power transmission antenna 110A, 110B, 110N which connect to each other, thereby enhancing the transmission efficiency of the wireless power signal.

Step S70 is performed by the device to be charged 201, 202, 203 which receives the wireless power signal, and the process proceeds to Step S80 to determine a charge state of the device to be charged 201, 202, 203. In Step S80, the device to be charged 201, 202, 203 determines whether charging is completed, and, if charging is completed, the process ends. However, if charging is not completed, the process proceeds to Step S90.

In Step S90, the device to be charged 201, 202, 203 updates the charge state information. The updated charge state information is transmitted again to the control unit 160 of the wireless power transmission apparatus 100.

The control unit 160 may continuously perform data communication with the device to be charged 201, 202, 203 so that Steps 320 to S60 may repeat until the device to be charged 201, 202, 203 is fully charged.

Meanwhile, in the case where at least one device to be charged 201, 202, 203 is detected in Step S10, Steps S20 to S60 may be performed as a multi process by means of time division control.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skidded in the art from this detailed description.

What is claimed is:

1. An apparatus for wireless power transmission, comprising:
a plurality of power transmission antennas configured to transmit a wireless power signal in a magnetic resonance manner by using resonant frequencies, the resonant frequencies having different bandwidths from each other;
a wireless power signal generating module configured to generate the wireless power signal;
a plurality of wireless power converting modules configured to convert a power level of the wireless power signal generated by the wireless power signal generating module, the wireless power converting modules having different power level conversion ranges from each other corresponding to the bandwidths of the resonant frequencies of the power transmission antenna;
a multiplexer matching module configured to selectively connect the wireless power converting modules to a corresponding power transmission antennas and to match impedances between the connected wireless power converting modules and the power transmission antennas;
a wireless communication module configured to send a detecting signal to detect a device to be charged, and configured to perform data communication with the detected device to be charged; and
a controller configured to calculate a required power of the device to be charged, based on a charge state information of the device which received by the wireless communication module and, configured to select the power transmission antennas and the wireless power converting modules to be connected according to the required power of the device to be charged, to adjust the power level of the wireless power signal,
wherein the plurality of wireless power converting modules respectively include amplifiers with different gains, and the amplifiers convert the wireless power signal in different power level conversion ranges according to the gains.

2. The apparatus for wireless power transmission according to claim 1, wherein the controller receives charge state information of the device to be charged, detected by the wireless communication module.

3. The apparatus for wireless power transmission according to claim 1, wherein the charge state information of the device to be charged includes an identification code for distinctively identifying the corresponding device to be charged and the required power.

4. The apparatus for wireless power transmission according to claim 1, wherein the controller continuously monitors the charge state information of the device to be charged, recalculates a required power of the device to be charged according to the monitoring result, and adjusts the power level of the wireless power signal according to the recalculated required power.

5. The apparatus for wireless power transmission according to claim 1, wherein, the controller transmits a wireless power signal to each device to be charged by means of time division control.

6. A method for controlling wireless power transmission, comprising:
  (a) sending, by a wireless communication module, a detecting signal for detecting a device to be charged; and
  (b) performing, by the wireless communication module, data communication with the detected device to be charged and receiving, by a wireless communication module, charge state information of the device to be charged;
  (c) calculating, by a controller, a required power of the device to be charged, based on the charge state information of the device to be charged;
  (d) selecting, by the controller, a power transmission antenna having a bandwidth of a resonant frequency capable of transmitting a wireless power signal corresponding to the required power of a device to be charged, and a wireless power converting module having a power level conversion range corresponding to the bandwidth of the resonant frequency of the corresponding power transmission antenna;
  (e) controlling, by the controller, the selected wireless power converting module to adjust a power level of the wireless power signal according to the required power of the device to be charged; and
  (f) connecting, by a multiplexer matching module, the selected wireless power converting module to the power transmission antennas to transmit the wireless power signal and performing, by the multiplexer matching module, impedances matching between the wireless power converting module and the power transmission antenna,
  wherein the plurality of wireless power converting modules respectively include amplifiers with different gains, and the amplifiers convert the wireless power signal in different power level conversion ranges according to the gains.

7. The method for controlling wireless power transmission according to claim 6, wherein the charge state information of the device to be charged includes an identification code for distinctively identifying the corresponding device to be charged and the required power.

8. The method for controlling wireless power transmission according to claim 6, after the step (f), further comprising:
  constantly monitoring the charge state information of the device to be charged;
  recalculating a required power of the device to be charged according to the monitoring result; and
  adjusting the power level of the wireless power signal according to the recalculated required power.

9. The method for controlling wireless power transmission according to claim 6, wherein, in the step (d), in the case where the number of the device to be charged is greater than one, the wireless power signal is transmitted to each device to be charged by means of time division control.

* * * * *